United States Patent [19]
Mullenberg

[11] Patent Number: 5,558,457
[45] Date of Patent: Sep. 24, 1996

[54] CHUCKING DEVICE FOR FIXING A HOLLOW SHAFT TO A SHAFT

[76] Inventor: Ralph Mullenberg, Im Wiesengrund 6, D-41516 Grevenbroich, Germany

[21] Appl. No.: 391,103

[22] Filed: Feb. 21, 1995

[30] Foreign Application Priority Data

Mar. 2, 1994 [DE] Germany .................... 9403482 U

[51] Int. Cl.⁶ .................................................. F16D 1/09
[52] U.S. Cl. ........................................ 403/370; 403/367
[58] Field of Search ............................ 403/370, 367, 403/374

[56] References Cited

U.S. PATENT DOCUMENTS

| 2,634,144 | 4/1953 | Friedman | 403/370 X |
| 4,279,530 | 7/1981 | Mullenberg | 403/370 X |

FOREIGN PATENT DOCUMENTS

| 102547 | 2/1959 | Germany . | |
| 1294751 | 5/1969 | Germany . | |
| 1425359 | 11/1969 | Germany . | |
| 2832917 | 2/1980 | Germany . | |
| 8119722 | 3/1983 | Germany . | |
| 3443757 | 6/1986 | Germany | 403/370 |
| 317469 | 7/1929 | United Kingdom | 403/367 |

*Primary Examiner*—Anthony Knight
*Attorney, Agent, or Firm*—Vickers, Daniels & Young

[57] ABSTRACT

A chucking device for the torque-transferring fixation of a hollow shaft to a shaft by a cone chucking device is provided. The cone chucking device clamps the hollow shaft and the shaft together in a frictionallly connected manner can be operated by axial clamping screws. An element of the cone chucking device extends in front of a face of the shaft extending transversely to the axis of the shaft and is interlockingly fixed on the shaft to secure against relative rotation.

12 Claims, 4 Drawing Sheets

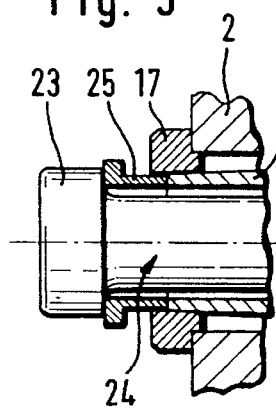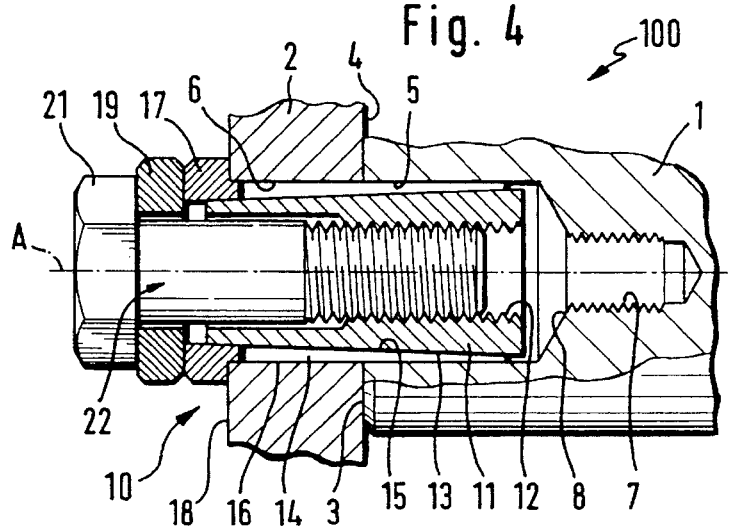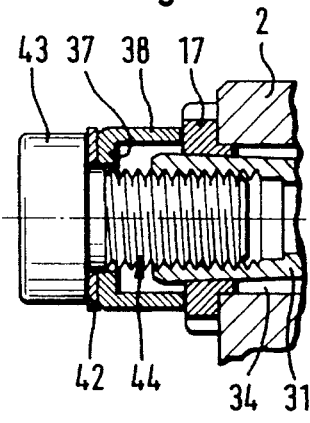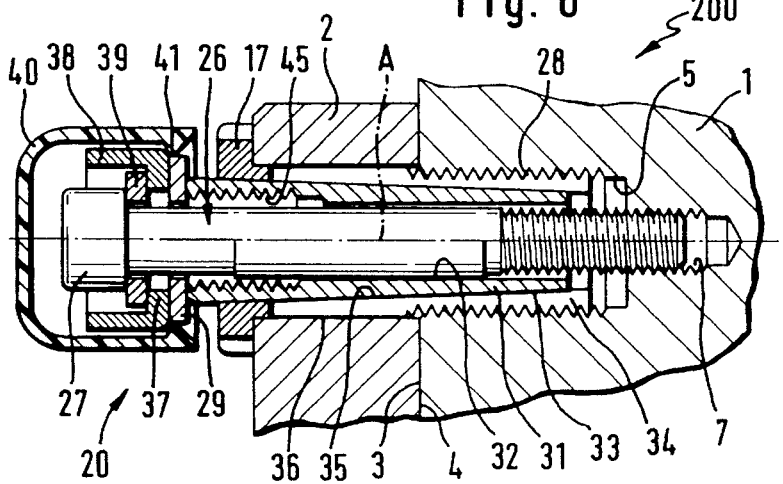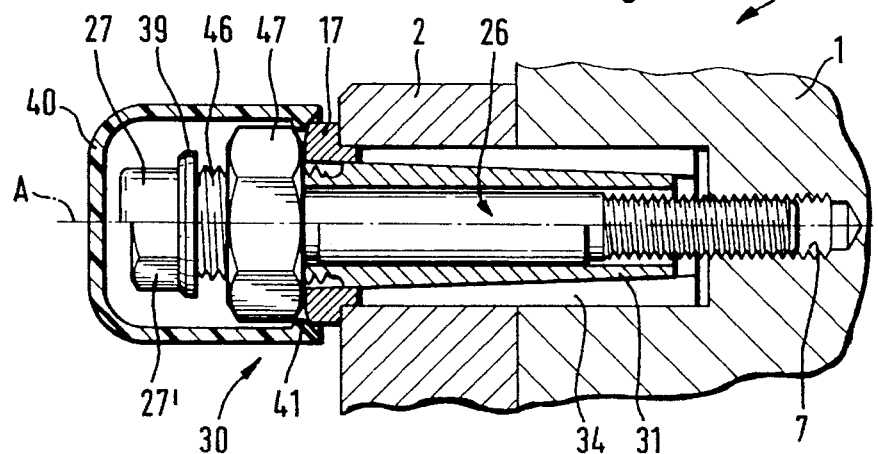

CHUCKING DEVICE FOR FIXING A HOLLOW SHAFT TO A SHAFT

The invention relates to a chucking device for the torque transferring fixation of a hollow shaft to a shaft having a axis by means of a cone chucking device which clamps the hollow shaft and the shaft together in a frictionally connected manner and can be operated by means of axially clamping screws of the species.

Such chucking devices are known from DE 28 32 917 A1, DE-PS 14 25 359, DE-GM 81 19 722 and DE-AS 12 94 751 (in the form of a wheel hub fastening). The torque transfer takes place by means of the radial clamping of the cone chucking device, i.e. purely by frictional connection. The transferable torque forces are limited by the clamping force applied by the clamping screw, the coefficient of friction at the joint faces and also by the radial sturdiness of the hollow shaft.

It is the object of the invention to increase the maximum transmissible torque of the mentioned chucking devices.

In this case the transmission of the torque takes place by means of a combined interlocking and frictional connection which can be designed in such a way that the joint faces on the shaft, on which the highest circumferential forces occur because of the decreased radial distance and therefore slipping most easily occurs when the maximum transmissible torque existing for the frictional transfer is exceeded, are not interrupted by keyways or similar recesses at which concentrated tensions occur and breaks can start because of which the torsion resistance of the shaft is correspondingly weakened.

In a first embodiment, in accordance with FIG. 1 the surface of the shaft extending transversely in relation to the axis is the front face of the shaft end. In this way the hollow shaft is fixed in the area of the shaft end.

However, this is not compulsory. The invention can be realized in the same way at a shaft shoulder, i.e. in the interior of the linear extension of the shaft.

A first embodiment of the interlocking fixation to be considered is a cotter seated in a transverse groove of the shaft end and entering into a transverse slit of the element of the cone chucking device extending in front of the surface of the shaft running transversely to the axis.

However, in the preferred embodiment of the invention, axis-parallel bolts are provided which enter into the element and the surface of the element of the cone chucking device extending transversely to the axis.

An embodiment of the bolts which is effective during the occurrence of torque in both directions is also provided.

The cone chucking bolts are seated under radial tension at the aligned bores of the shaft and of the element of the cone chucking device, so that a connection which is absolutely free of play is provided and a deflection need not be feared even under stress by torque in differing directions.

Exemplary embodiments of the invention are represented in the drawings.

FIG. 4 shows a longitudinal section through the axis of a cone chucking bolt suitable for the invention in the clamped state;

FIG. 5 shows the left part of FIG. 4 in the state of being released;

FIG. 6 and 7 show the corresponding views of a further cone chucking bolt;

FIG. 8 shows a view corresponding to FIG. 1 of a third embodiment of a cone chucking bolt.

Figure 1:
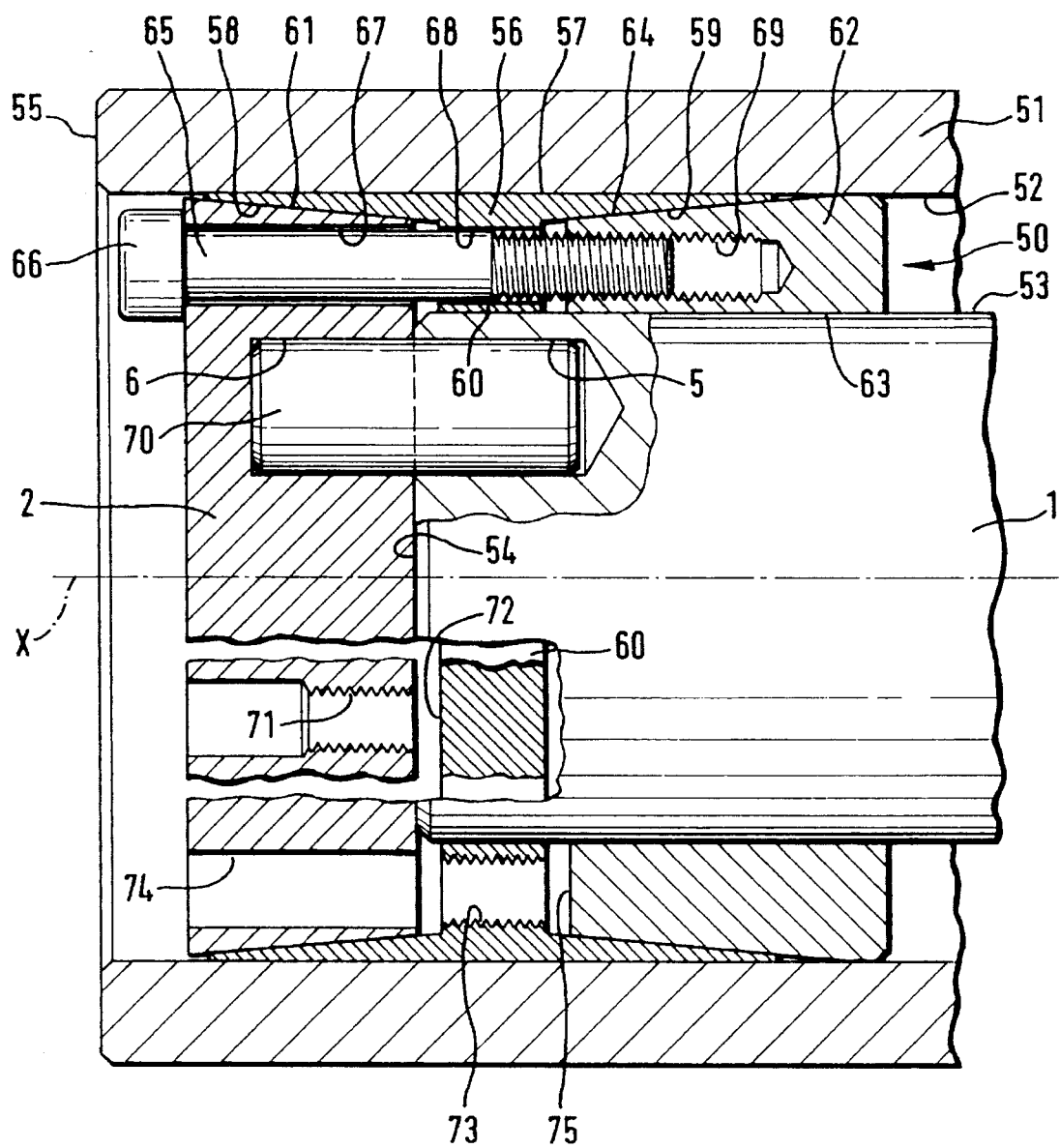
FIG. 1 shows a view of a connection of a shaft with a hollow shaft, partially in a section passing through the axis.

The chucking device of FIG. 1 is intended for clamping of a hollow shaft 51 to the end of a shaft 1, which has a cylindrical exterior circumference 53 with an axis X. At the end, the shaft 1 has a flat front face 54 extending perpendicularly to the axis X.

The hollow shaft 51 has a cylindrical interior circumference 52 of a greater radius than the circumferential face 53 of the shaft 1. At the end, its front face 55 axially projects past the front face 54.

A cone chucking device in the form of a double cone chuck set, identified as a unit by 50, is arranged in the radial space between the circumferential faces 52, 53. The double cone chuck set 50 comprises a double cone ring 56 with a cylindrical outer circumferential face 57 resting against the inner circumferential face 52 and two cone faces 58 and 59, which increase in diameter toward the outside, with cone angles located in the self-locking range. An interior, centered circumferential bar 60 is provided in the center between the cone faces 58 and 59, which rests on the circumferential face 53.

A cone disk 2, which extends axially in front of the front face 54 inside the front face 55 and radially inside the cone face 58 and which on the circumference has a cone face 61 with the same cone angle as the cone face 58 and rests against it, cooperates with the cone face 58. A cone ring 62 cooperates with the cone face 59, at the right in FIG. 1, whose cylindrical inner circumferential face 63 rests on the circumferential face 53 of the shaft 1 and whose outer conical circumferential face 64 rests on the cone face 59.

The heads 66 of the clamping screws 65 rest on the cone disk 2 from the outside, i.e. from the side distant from the shaft 1 and are appropriately accessible, extend through it and the circumferential bar 60 in through-bores 67 or 68 and enter into threaded bores 69 of the cone ring 62. When the clamping screws 65 are tightened, the cone disk 2 and the cone ring 62 approach each other and the double cone chuck set 50 widens radially with the elements sliding off the cone faces 58, 61 or 59, 64, by means of which frictionally connected radial clamping or cramping takes place at the circumferential faces 52, 53.

So that no slipping of the double cone chuck set 50 on the shaft 1 occurs when the maximum torque, defined by the clamping force of the clamping screws 65, the coefficient of friction at the joint faces 52, 53 and the radial sturdiness of the hollow shaft 51, is exceeded, cylindrical bolts 70 without play, which lock the cone disk 2 to the front face 54 in a manner fixed against relative rotation, are seated outside the axis X in aligned bores 5, 6 of the shaft 1 or the cone disk 2. Because of this, slippage can occur at best at the faces 52, 57, i.e. radially further outward and at a correspondingly increased torque.

Detachment screws can be screwed into the threaded bores 71 of the cone disk 2, which become seated against the place 72 of the circumferential bar 60 which is free of bores and which push the cone disk 2 axially away from the double cone ring 56. It is possible in a corresponding manner to screw detachment screws into the threaded bores 73 of the circumferential bar 60, which extend through through-bores 74 of the cone disk 2 and become seated against places 75 of the cone ring 62 which are free of bores and push it away from the double cone ring 56.

To the extent that functionally equivalent parts are contained in the further embodiments, the same reference numerals are used.

Figure 2:
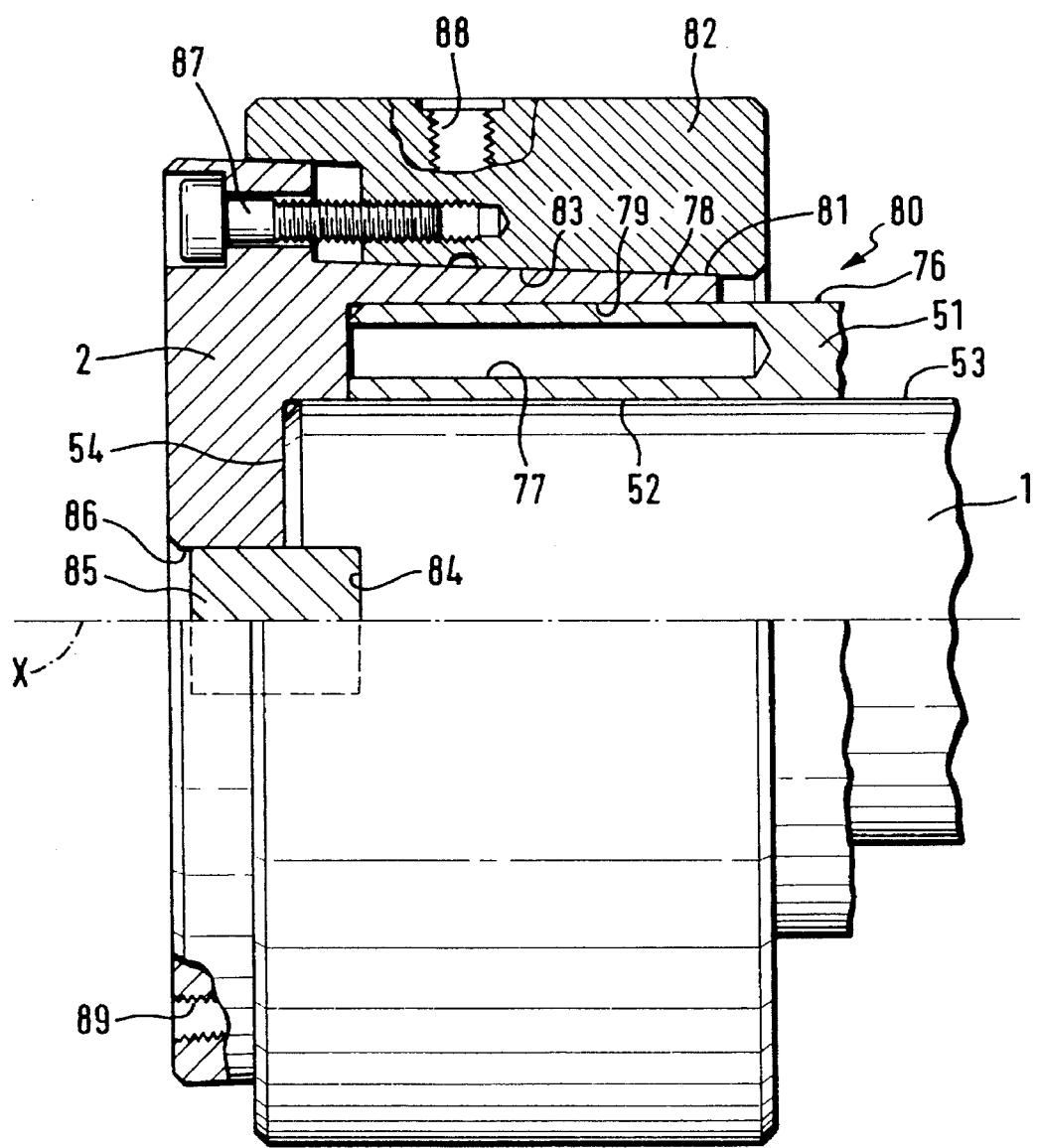
FIG. 2 shows a corresponding view of a further embodiment.

With the chucking device of FIG. 2, the inner circumferential face 52 of the hollow shaft 51 is seated directly on the outer circumferential face 53 of the shaft 1. It is compressed by a cone device acting on the outer circumferential face 76 of the hollow shaft 51 in the form of a cone chuck set 80 and is clamped on the shaft 1 in a frictionally connected manner. To make the compression easier and not to lose too much of the clamping force of the cone chuck set 80 for the deformation of the end of the hollow shaft 51, it has axially parallel deformation bores 77 at some places distributed over the circumference and extending linearly over the clamping area.

The cone chuck set 80 comprises an inner cone ring 78, which rests with a cylindrical inner circumferential face 79 on the outer circumferential face 76 of the hollow shaft 51 and which has an outer conical circumferential face 81 located in the self-locking range, on which an outer cone ring 82 with a corresponding inner cone face 83 is disposed. The outer cone ring 82 is not divided in the circumferential direction and has a considerable cross section for receiving the ring tensile stresses required for compressing the end of the hollow shaft 51 on the shaft 1.

With a cover element 2 connected with it in one piece, the inner cone ring 78 overlaps the front face 54 of the shaft 1. A transverse groove 84 is provided in the center of the front face 54 of the shaft 1, in which a key 85 is disposed, which is not longer than would correspond to the diameter of the shaft 1, and which enters into a transverse slit 86 of corresponding length in the cover element 2 in order to lock the cover element 2 to the shaft 1 fixed against relative rotation.

The cover element 2 continues radially outward past the cone face 81 and there has the clamping screws 87 on a graduated circle, which enter into the outer cone ring 82 and pull it against the cover element 2 in order to cause the clamping while sliding off over the cone faces 81, 83. The sliding on the cone faces 81, 83 can be aided by a lubricant pressed in at the connectors 88. The threaded bores 89 cut between the clamping screws 87 are used for the insertion of detachment screws which put the cone ring 82 away.

Figures 3, 3A:
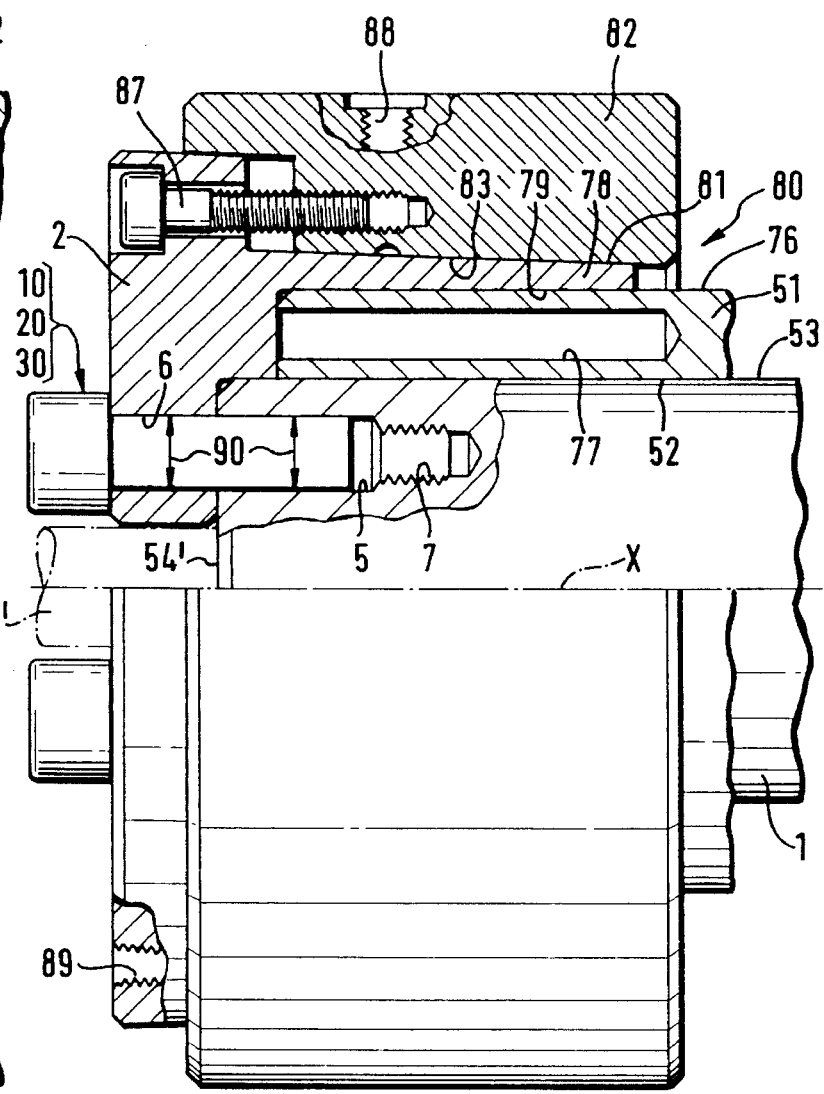
FIGS. 3 and 3a show corresponding views of a third embodiment.

The exemplary embodiment of FIG. 3 to a great extent corresponds that of FIG. 2, with the exception of the fixation against relative rotation of the cover element 2 at the end of the shaft 1. In place of the keys 85, bolts 10, 20, 30 are provided here and are arranged outside of the axis X, which pass through the aligned bores 5, 6 in the shaft 1 or the cover element 2 and can be radially widened in the direction of the arrows 90, so that they are seated free of play in the bores 5, 6. The bolts 10, 20, 30 will be described in detail by means of FIGS. 4 to 8. Some of these bolts 10, 20, 30 can be provided distributed over the circumference.

It is further indicated by dashed lines in FIG. 3 that the shaft 1 can have an extension 1' which passes through a central opening of the cover element 2. In this case the front face 54' is also a shoulder of the shaft 1.

It is indicated in FIG. 3a that the cover element 2 itself can also be embodied as a functional component having a function outside of the cone chuck set 80, namely as a flange with flange bores 92 located radially outside of the cone chuck set 80 and distributed over the circumference.

Cone clamping bolts 10, 20, 30 are represented in FIGS. 4 to 8 which can be employed with the embodiment of FIG. 3.

The cone clamping bolt 10 of the cone chucking device 100 of FIGS. 4 and 5 has an axis A. It enters into a blind bore 5 of the shaft 1 and passes through a through-bore 6 in the cover element 2. The bores 5, 6 have the same diameter. A threaded bore 7 which is coaxial with the axis A is provided in the bottom 8 of the blind bore 5.

The cone clamping bolt 10 comprises an inner cone element 11 with a threaded bore 12 coaxially with the axis A and a conical circumferential face 13 with a cone angle located in the self-locking range, for example 1:12, the diameter of which is reduced from the right to the left in FIG. 4.

The inner cone element 11 is surrounded by a bushing-like outer component 14 having an inner cone face 15 with the same cone angle as the cone face 13 and with which it rests on the cone face 13. The outer circumferential face 16 is cylindrical and has such a diameter that the cone clamping bolt 10 just fits into the bores 5, 6 in the non-clamped state.

The outer bolt element 14 has on its end which is to the left in FIG. 4 a radial circumferential projection 17 which in the exemplary embodiment is embodied as a circumferential collar which continuously encloses the circumference. With its right front, the circumferential collar rests against the outer boundary face 18 of the cover element 2 which is to the left in FIG. 4, i.e. the outer one in relation to the blind bore 5.

The head 21 of a clamping screw, which is identified in its entirety by 22 and which enters into the threaded bore 12 of the inner bolt element 11 with its threaded portion, is supported via an intermediate ring 19 on the outer front face of the circumferential projection 17.

The circumferential projection 17 can have a key face on its outer circumference so that a solid connection can be obtained when tightening the clamping screw 22. In the course of this tightening, the inner bolt element 11 is pulled from right to left into the outer bolt element 14, wherein the cone faces 13, 15 slide on each other. Because of this the outer cone element 14 is radially widened and is clamped free of play in the bores 5, 6. To ease the widening and not to lose too much of the clamping force of the clamping screw 22 by the deformation of the outer bolt element 14, the outer bolt element 14 can be linearly slit as far as close to the circumferential projection 17, as indicated by the lack of cross-hatching.

When tightening the clamping screw 22, the axial forces remain entirely within the cone clamping bolt 10. In this case the circumferential projection 17 has only the function of a stop when inserting the cone clamping bolt 10.

To release the chucking device 100 the clamping screw 22 is screwed out. The bolt elements 11, 14 remain clamped in the course of this because of the self-locking angle. A detachment screw 24 of an appropriately lesser diameter is now inserted through the threaded bore 12 and its end screwed into the thread bore 7 at the bottom of the blind bore 5. An auxiliary ring 25 is provided between the head 23 of the detachment screw 24 and the front face which is to the left in FIGS. 4 and 5 of the inner bolt element 11, which transfers the detachment forces and by means of which the inner bolt element 11 of FIGS. 4 and 5 is displaced to the right, i.e. into the blind bore 5, in the course of tightening of the detachment screw 24. It is understood that the lengths are such that sufficient space remains for the displacement on the side of the inner bolt element 11 on the right in FIG. 4.

During the release, the inner bolt element 11 is pulled to the right and the outer bolt element 14 is maintained in place by the circumferential projection 17. Thus, in the course of release, the circumferential projection 17 of the chucking device 100 has a function as a transmitter of the release forces.

To the extent that corresponding elements are present in the further chucking devices, the same reference numerals have been employed.

In the chucking device 200 of FIGS. 6 and 7 the cone clamping bolt 20 comprises an inner bolt element 31 with a through-bore 32 coaxial with the axis A. The conical outer circumferential face 33 with a cone angle located in the self-locking angle cooperates with the conical inner circumferential face 35 of a bushing-like outer bolt element 34 having an essentially cylindrical outer circumference 36 which fits into the through-bore 6 of the cover element 2 and, in the area extending into the shaft 1, also has an outer thread 28 which enters into a corresponding inner thread in the blind bore 5.

At the left end in FIGS. 6 and 7, the outer bolt element 34 also has a circumferential projection 17 which in its function corresponds to the circumferential projection 17 of FIGS. 4 and 5 and whose outer circumference is embodied for the engagement with a hook wrench.

In the exemplary embodiment in accordance with FIGS. 6 and 7 the inner bolt element 31 slightly projects axially to the left past the circumferential projection 17. In front of the front end of the inner bolt element 31 an intermediate ring 29 is provided, against which the the front face of the inner collar 37 of an auxiliary ring 38 abuts. A washer 39 supported on the head 27 of the clamping screw 26 acts against the opposite border of the inner collar 37. In the course of tightening the clamping screw 26, the inner bolt element 31 is driven to the right into the outer bolt element 34 via the elements 39, 37, 39, wherein the outer bolt element 34 is maintained in place by the circumferential projection 17 at the border of the component 2 to the left in FIG. 6.

In this embodiment the circumferential projection 17 therefore constitutes the abutment against the axial forces of the clamping screw 26 during tightening.

To release the cone clamping bolt 20 of the chucking device 200, the clamping screw 26 is turned out and in its place a detachment screw 44 of a larger diameter than the clamping screw 26 is screwed into an inner thread 45 of the inner bolt element 31, which has a larger diameter than the through-bore 32 and which is attached on the end of the conical circumferential face 33 having the larger diameter. The auxiliary ring 38 is turned around out of the clamping position, in which it is only kept available but has no actual function, and brought into the position illustrated in FIG. 7. The head 43 of the detachment screw 44 acts via the washer 42 against the end of the auxiliary ring 38 which has the inner collar 37. When the detachment screw 44 is tightened, the inner cone element 31 is pulled to the left in FIG. 7 out of the outer cone element 34 and thus released.

A cup-shaped cap 40 made of a suitable plastic material is provided for the protection of the elements of the cone clamping bolt 20 projecting toward the left in FIG. 6 and extends with an inner circumferential rib 41 behind the right outer circumferential edge of the auxiliary ring 38 which slightly projects radially past the washer 29.

In the chucking device 300 of FIG. 8 the function of the cone clamping bolt 30 is the same as in the chucking device 200 with the difference that the inner bolt element 31 has an outer thread 46 on its outer circumference axially outside the circumferential projection 17, on which a nut 47 can be screwed which rests directly against the border surface on the left in FIG. 8 of the circumferential projection 17 and in the course of tightening pulls the inner bolt element 31 out of the outer bolt element 34 to the left in FIG. 8. The forces during release remain entirely inside the cone clamping bolt 30. The circumferential projection 17 and the threaded bore 7 act together only during tightening of the chucking device 300.

In this exemplary embodiment the inner circumferential rib 41 of the cup-shaped cap 40 extends behind the right edge of the nut 47.

In FIG. 8 it is further indicated that in place of a head 27 with an internal hexagon socket it is also possible to use a screw with a head 27' with an external hexagon shape.

Having thus described the invention, it is claimed:

1. A chucking device for the torque-transferring fixation of a hollow shaft to a shaft having an axis by means of a cone chucking device which clamps the hollow shaft and the shaft together in a frictionally connected manner and can be operated by means of axial clamping screws, said shaft having a front face the improvement comprising: a circular element of the cone chucking device extends across said front face of the shaft and extends transversely to said axis and means for interlockingly fixing said front face of said shaft to said element to secure against relative rotation.

2. A chucking device in accordance with claim 1, wherein said front face of the shaft extending tranversely to the axis includes a shaft shoulder.

3. A chucking device in accordance with claim 2, wherein said means for interlockingly fixing includes a cotter extending between said element and said front face.

4. A chucking device in accordance with claim 2, wherein said element and said front face includes bores having cotter means therein for fixing relative rotation therebetween, said bores being parallel to said axis, radially aligned with each other and outside the shaft axis.

5. A chucking device in accordance with claim 1, wherein said means for interlockingly fixing includes a cotter extending between said element and said front face.

6. A chucking device in accordance with claim 1, wherein said element and said front face include bores having bolt means therein for fixing relative rotation therebetween, said bores being parallel to said axis, radially aligned with each other and entirely outside the shaft axis.

7. A chucking device in accordance with claim 6, wherein said bolt means are cone clamping bolts which can be radially widened and released by actuation on only one end.

8. A chucking device for the torque-transferring fixation of a hollow shaft to a shaft having an axis and a shaft circumference by means of a cone chucking device which clamps the hollow shaft and the shaft together in a frictionally connected manner and can be operated by means of axial clamping screws, said shaft having a front face, the improvement comprising: an element of the cone chucking device extending in front of said front face of the shaft and extending transversely to said axis and means for interlockingly fixing said shaft to said front face entirely within said circumference of said shaft to secure against relative rotation.

9. A chucking device for the torque-transferring fixation of a hollow shaft to a shaft having an axis by means of a cone chucking device which clamps the hollow shaft and the shaft together in a frictionally connected manner and can be operated by means of axial clamping screws, said shaft having a front face, the improvement comprising: a disk element of said cone chucking device extending in front of said front face of said shaft and extending transversely to said axis and means for interlockingly fixing said front face of said shaft to said disk to secure against relative rotation, said front face of said shaft including a bore having a side face and a bottom face, said disk element having a shaft face adjacent said shaft and an outer face, said shaft face including a bore having a side face and a bottom face and aligned in substantial registry with said shaft bore, said means for interlockingly fixing including cotter means for fixing relative rotation located within said aligned bores.

10. A chucking device for the torque-transferring fixation of a hollow shaft to a shaft having an axis by means of a cone chucking device which clamps the hollow shaft and the shaft together in a frictionally connected manner and can be operated by means of axial clamping screws, said shaft having a front face, the improvement comprising: an element of the cone chucking device extending in front of said front face of said shaft and extending transversely to said axis and means for interlockingly fixing said front face of said shaft to said element to secure against relative rotation, and means for detaching said frictional connection between said hollow shaft and said shaft.

11. The chucking device of claim 10, wherein said means for detaching includes a hole through said element, a seat on said shaft, and detachment screw means therein, said hole and said seat aligned in substantial registry.

12. The chucking device of claim 11, wherein said hole through said element includes a threaded portion.

* * * * *